United States Patent [19]
Harada et al.

[11] 3,846,349
[45] Nov. 5, 1974

[54] POLYPROPYLENE COMPOSITION AND FOAMED POLYPROPYLENE SHEET THEREFROM

[75] Inventors: Taro Harada, Suita; Nobuo Ito, Ibaragi; Kanemitsu Ohishi, Toyonaka, all of Japan

[73] Assignee: Sumitomo Chemical Company, Limited, Osaka, Japan

[22] Filed: June 26, 1973

[21] Appl. No.: 373,639

[52] U.S. Cl. .................. 260/2.5 HA, 260/897 A
[51] Int. Cl. ........................................ C08f 47/10
[58] Field of Search ............... 260/2.5 HA, 897 A

[56] References Cited
UNITED STATES PATENTS

| | | | |
|---|---|---|---|
| 3,372,049 | 3/1968 | Schaffhausen | 260/897 A |
| 3,511,742 | 5/1970 | Rasmussen | 260/897 A |
| 3,515,775 | 6/1970 | Combs et al. | 260/897 A |
| 3,586,645 | 5/1971 | Granger et al. | 260/2.5 HA |

*Primary Examiner*—Morton Foelak
*Attorney, Agent, or Firm*—Stevens, Davis, Miller & Mosher

[57] ABSTRACT

A polypropylene composition consisting essentially of from 30 to 80 parts by weight of a crystalline polypropylene, from 10 to 40 parts by weight of a non-crystalline polypropylene, and from 10 to 40 parts by weight of a low density polyethylene. A foamed polypropylene sheet made of the polypropylene composition has excellent impact resistance and a good texture.

4 Claims, No Drawings

POLYPROPYLENE COMPOSITION AND FOAMED POLYPROPYLENE SHEET THEREFROM

This invention relates to a polypropylene composition and to a foamed polypropylene sheet made of said composition. More particularly, the invention pertains to a polypropylene composition for a foamed polypropylene sheet consisting essentially of a crystalline polypropylene, a non-crystalline polypropylene, and a low density polyethylene, and to a foamed polypropylene sheet having excellent impact resistance and a good texture and being relatively soft, which is obtained by adding a blowing agent to said composition and extruding the resulting mixture in a conventional expansion method.

Conventional foamed sheets obtained by extruding a mixture of a crystalline polypropylene and a blowing agent are greatly inferior in impact resistance, are stiff and do not have a soft and good texture as a leather does.

The present inventors have extensively studied to succeed in overcoming the above disadvantages.

An object of this invention is to provide a polypropylene composition.

Another object of this invention is to provide a foamed sheet having excellent impact resistance and a soft and leather-like texture.

A further object of this invention is to provide a foamed sheet of a composition of a crystalline polypropylene, a non-crystalline polypropylene and a low density polyethylene.

A still further object of this invention is to provide a foamed sheet free from the disadvantages which conventional foamed sheets of crystalline polypropylene have.

Other objects and the advantages of this invention will become apparent from the following description.

According to this invention, there is provided a polypropylene composition for a foamed polypropylene sheet consisting essentially of from 30 to 80 parts by weight of a crystalline polypropylene, from 10 to 40 parts by weight of a non-crystalline polypropylene and from 10 to 40 parts by weight of a low density polyethylene, and a foamed polypropylene sheet made of said composition.

By mixing the crystalline polypropylene with the non-crystalline polypropylene and the low density polyethylene, excellent impact resistance, a suitable softness and a leather-like good texture can be imparted to a foamed sheet obtained from the mixture. Since the non-crystalline polypropylene has a good compatibility with the crystalline polypropylene and the low density polyethylene, the above advantages are remarkable. When the amount of the non-crystalline polypropylene in the composition is less than 10 parts by weight, the effect is small and when the amount is more than 40 parts by weight, the good texture of the foamed sheet thus obtained is rather lost and the resulting foamed sheet becomes tacky. When the amount of the low density polyethylene in the composition is less than 10 parts by weight, the effect is small and when the amount is more than 40 parts by weight, the compatibility of the low density polyethylene with the crystalline polypropylene and the non-crystalline polypropylene becomes poor, and the resulting foamed sheet is so soft that it is inconvenient in secondary molding thereof.

Accordingly, a characteristic feature of this invention is a polypropylene composition consisting essentially of from 30 to 80 parts by weight of the crystalline polypropylene, from 10 to 40 parts by weight of the non-crystalline polypropylene and from 10 to 40 parts by weight of the low density polyethylene, and another characteristic feature is that the composition is foamed into a foamed sheet. The leather-like good texture mentioned above is obtained by foaming the composition.

The crystalline polypropylene to be used in the present invention is one prepared in the presence of a Ziegler-Natta type catalyst. It is a substantially crystalline polypropylene composed mainly of propylene and containing at least 50 percent by weight of an isotactic portion, and has a melt index of about 10 or less at 230°C under a load of 2160 g. Examples of the crystalline polypropylene are crystalline propylene homopolymers and crystalline propylene-ethylene copolymers. The crystalline polypropylene should be contained in the composition in an amount of 30 to 80 parts by weight, preferably 40 to 80 parts by weight, more preferably 70 to 80 parts by weight per 100 parts by weight of the mixture. The non-crystalline polypropylene to be used in the present invention is one by-produced as a polymerization medium (n-heptane)-soluble component in the production of a crystalline propylene homopolymer or a crystalline propylene-ethylene copolymer by use of a catalyst comprising a titanium halide and an alkylaluminum. The non-crystalline polypropylene is a substantially amorphous polypropylene having an intrinsic viscosity in tetralin at 135°C in the range of 0.35 to 3.0 dl/g and a crystallinity of 35 percent by weight or less according to ordinary x-ray analysis. The non-crystalline polypropylene should be contained in the composition in an amount of 10 to 40 parts by weight, preferably 10 to 30 parts by weight, more preferably 10 to 20 parts by weight, per 100 parts by weight of the mixture.

The low density polyethylene to be used in the present invention is one prepared by polymerization of ethylene, or a mixture of ethylene and a small amount of such a comonomer as vinyl acetate or ethyl acrylate, in tubular reactor or autoclave-type reactor at a temperature of 50° to 300°C under a pressure of 500 to 4,000 atm. in the presence of a catalyst or catalysts such as oxygen, organic peroxides, or azo compounds. The low density polyethylene has a density of 0.940 or less, preferably 0.91 to 0.94, and a melt index of 0.5 to 5.0, at 190°C under a load of 2,160 g. The low density polyethylene should be contained in the composition in an amount of 10 to 40 parts by weight, preferably 10 to 30 parts by weight, more preferably 10 to 20 parts by weight, per 100 parts by weight of the mixture.

Mixing the crystalline polypropylene, the non-crystalline polypropylene and the low density polyethylene for the preparation of the polypropylene composition of the present invention is effected by known methods using a Henschel mixer, a Banbury mixer, or the like. Further, the mixing procedure for preparing the foamed polypropylene sheet is such that a blowing agent is incorporated into a part of the low density polyethylene and the resulting mixture is dry-blended with the polypropylene composition obtained by mixing the crystalline polypropylene, the non-crystalline polypropylene and the remaining low density polyethylene by the above method.

The foamed polypropylene sheet can be obtained by a conventional expansion method, for example, by adding a blowing agent to the polypropylene composition, such as by adding to the composition a chemical blowing agent or a volatile expansion agent, or injecting an inert gas into a cylinder of an extruder, or a combination thereof; and then extruding the resulting mixture into a foamed polypropylene sheet at a resin temperature of 150° to 250°C and at a resin pressure of 50 to 350 kg/cm². The foaming ratio (the specific gravity of the unfoamed sheet/the specific gravity of the foamed sheet) is 1.1 to 2.0 to obtain a good surface state and particularly preferable texture.

The blowing agent to be used in the present invention is not limited and includes chemical blowing agents such as, for example, azo compounds such as azodicarbonamide, azo-bis formamide; nitroso compounds such as dinitrosopentamethylene tetramine and dinitroso terephthalamide; and sulfonyl hydrazides such as p-toluenesulfonyl semicarbazide and p,p'-oxybisbenzene-sulfonyl hydrazide; and volatile expansion agents such as, for example, lower alkyl hydrocarbons such as propane, butane, n-pentane hexane and cyclohexane; lower alkyl halides such as methyl chloride, dichlorodifluoromethane, trichloromonofluoromethane; inert gases such as nitrogen, carbon monooxide and ammonia.

The chemical blowing agent should be contained in the present polypropylene composition in an amount of 0.2 to 10 parts by weight, preferably 0.3 to 1.0 parts by weight, per 100 parts by weight of the composition.

In the case of using the volatile expansion agent, the amount of the volatile expansion agent included in the present polypropylene composition is 0.3 to 10 parts by weight, preferably 0.5 to 3 parts by weight, per 100 parts by weight of the composition.

The following examples illustrate this invention further in detail but should not be construed as limiting the scope of the invention.

The physical properties of the foamed polypropylene sheet in the Table of the examples were measured according to ordinary procedures. That is, the impact resistance (1) was determined by measuring a tear strength of Elmendorf according to JIS 1702; the impact resistance (2) was determined by cutting a piece of 40 cm in length and 20 cm in width in the direction perpendicular with the extrusion direction of the sheet (the longitudinal direction of the sheet) out of the sheet, folding the piece to put one end of its longitudinal direction on the other end and striking the folding part with the open hand to investigate whether or not the piece was cracked; and the stiffness was determined by measuring a torsion stiffness according to JIS K 6745. The texture was determined by observing with the nacked eye, in which a soft, leather-like preferable texture was indicated "good."

EXAMPLES 1 TO 4

A composition as shown in the Table is well mixed by means of an extruder and then foamed into pellets. With 100 parts by weight of the pellet was mixed by a Henschel mixer 0.5 parts by weight of azodicarbonamide as a chemical blowing agent in Examples 1, 3 and 4 and Comparative Examples 1 to 5. To 100 parts by weight of the pellet was added 1.0 parts by weight of n-pentane as a volatile expansion agent in Example 2.

Each of the resulting mixtures was foamed into a foamed sheet by means of a conventional sheet extruder at a resin temperature of 180° – 220°C and at a resin pressure of 50 – 200 kg/cm².

The foamed polypropylene sheet thus obtained had a foaming ratio of 1.3.

The properties of the sheet are shown in the Table.

As is clear from the Table, the foamed sheets obtained from the present composition are superior in impact resistance, have a suitable softness and have a leather-like, soft texture.

Table

| Ex. No. | Components | Amount (part by wt.) | Foaming ratio | Impact resistance (1) (kg/cm) | Impact resistance (2) | Stiffness (kg/cm²) | Texture |
|---|---|---|---|---|---|---|---|
| 1 | Crystalline polypropylene*¹ (MI=8 ethylene-propylene copolymer) | 40 | 1.3 | >20 | Not cracked | 600 | Good |
| | Non-crystalline polypropylene*² ([η]=0.46) | 30 | | | | | |
| | Low density polyethylene*³ (MI=2.0) | 30 | | | | | |
| 2 | Crystalline polypropylene (MI=8 ethylene-propylene copolymer) | 50 | 1.3 | >20 | Not cracked | 600 | Good |
| | Non-crystalline polypropylene ([η]=0.46) | 25 | | | | | |
| | Low density polyethylene (MI=2.0) | 25 | | | | | |
| 3 | Crystalline polypropylene (MI=8 ethylene-propylene copolymer) | 60 | 1.3 | >20 | Not cracked | 800 | Good |
| | Non-crystalline polypropylene ([η]=0.46) | 20 | | | | | |
| | Low density polyethylene (MI=2.0) | 20 | | | | | |
| 4 | Crystalline polypropylene (MI=8 ethylene-propylene copolymer) | 70 | 1.3 | >20 | Not cracked | 900 | Good |
| | Non-crystalline polypropylene ([η]=0.46) | 15 | | | | | |
| | Low density polyethylene (MI=2.0) | 15 | | | | | |
| Comparative 1 | Crystalline polypropylene (MI=1 homopolymer) | 100 | 1.3 | < 5 | Cracked | 2,000 | Rigid texture |
| Comparative 2 | Crystalline polypropylene (MI=8 ethylene-propylene copolymer) | 85 | 1.3 | < 5 | Cracked | 1,800 | Rigid texture |
| | Non-crystalline polypropylene ([η]=0.46) | 10 | | | | | |

Table—Continued

| Ex. No. | Components | Amount (part by wt.) | Foaming ratio | Impact resistance (1) (kg/cm) | Impact resistance (2) | Stiffness (kg/cm²) | Texture |
|---|---|---|---|---|---|---|---|
| Comparative 3 | Low density polyethylene (MI=2.0) | 5 | 1.3 | 5.0 | Cracked | 1,750 | Somewhat rigid texture |
|  | Crystalline polypropylene (MI=8 ethylene-propylene copolymer) | 85 |  |  |  |  |  |
|  | Non-crystalline polypropylene ([η]=0.46) | 5 |  |  |  |  |  |
| Comparative 4 | Low density polyethylene (MI=2.0) | 10 | 1.3 | 6.0 | Cracked | 1,600 | Somewhat rigid texture |
|  | Crystalline polypropylene (MI<8 ethylene-propylene copolymer) | 80 |  |  |  |  |  |
|  | Non-crystalline polypropylene ([η]=0.46) | 20 |  |  |  |  |  |
| Comparative 5 | Crystalline polypropylene (MI=8 ethylene-propylene copolymer) | 30 | 1.3 | >20 | Not cracked | < 500 | Very soft. Inferior in gloss |
|  | Non-crystalline polypropylene ([η]=0.46) | 30 |  |  |  |  |  |
|  | Low density polyethylene (MI=2.0) | 40 |  |  |  |  |  |

Note:
*¹The melt index of crystalline polypropylene was measured at 230°C under a load of 2160 g.
*²The intrinsic viscosity of non-crystalline polypropylene was measured in tetralin at 135°C.
*³The melt index of low density polyethylene was measured at 190°C under a load of 2160 g.

What is claimed is:

1. A foamed polypropylene sheet having excellent impact resistance and a good texture and being soft, which is obtained by adding a blowing agent to a polypropylene composition consisting essentially of from 30 to 80 parts by weight of a crystalline polypropylene, from 10 to 40 parts by weight of a non-crystalline polypropylene and from 10 to 40 parts by weight of a low density polyethylene and then extruding the resulting mixture to foam.

2. The sheet according to claim 1, wherein the blowing agent is a member selected from the group consisting of a chemical blowing agent and a volatile expansion agent.

3. The sheet according to claim 1, wherein the mixture is extruded at a resin temperature of 150° to 250°C and at a resin pressure of 50 to 350 kg/cm².

4. The sheet according to claim 1, wherein the sheet has a foaming ratio of 1.1 to 2.0.

* * * * *